(12) United States Patent
Hagsand et al.

(10) Patent No.: US 7,254,142 B2
(45) Date of Patent: Aug. 7, 2007

(54) METHOD OF ADJUSTING A BANDWIDTH CAPACITY OF A DYNAMIC CHANNEL

(75) Inventors: Olof Hagsand, Alta (SE); Kjell Hansson, Rimbo (SE)

(73) Assignee: Metro Packet Systems Inc.

( * ) Notice: Subject to any disclaimer, the term of this patent is extended or adjusted under 35 U.S.C. 154(b) by 974 days.

(21) Appl. No.: 10/344,111

(22) PCT Filed: Oct. 30, 2001

(86) PCT No.: PCT/SE01/02395

§ 371 (c)(1),
(2), (4) Date: Feb. 5, 2003

(87) PCT Pub. No.: WO02/37724

PCT Pub. Date: May 10, 2002

(65) Prior Publication Data

US 2003/0165141 A1   Sep. 4, 2003

(51) Int. Cl.
*H04J 3/16* (2006.01)
*H04J 3/22* (2006.01)

(52) U.S. Cl. ........................................ 370/468
(58) Field of Classification Search ........... 370/395.21, 370/395.41, 468, 477, 465; 375/240, 240.02; 455/452.1
See application file for complete search history.

(56) References Cited

U.S. PATENT DOCUMENTS 6,771,661 B1* 8/2004 Chawla et al. ............... 370/468
7,035,211 B1* 4/2006 Smith et al. ................. 370/230

* cited by examiner

*Primary Examiner*—Ricky Q. Ngo
*Assistant Examiner*—Pao Sinkantarakorn
(74) *Attorney, Agent, or Firm*—Rolf Fasth; Fasth Law Offices

(57) ABSTRACT

The method is for adjusting a bandwidth capacity of a dynamic channel in a network topology by allocating a bandwith value (b1) to the dynamic channel wherein the channel extends from a first node to a second node in a network topology. The traffic flow in the channel is measured to calculate a measured bandwidth value (B1). The allocated bandwidth value (b1) is dynamically adjusted to the measured bandwidth value (B1) so adjust the bandwidth (b1) to the actual bandwidth used.

7 Claims, 2 Drawing Sheets

B = measured bandwidth requirement
b = allocated bandwidth parameter
Of = offset parameter
De = delta parameter
p = peak bandwidth parameter
m = minimum bandwidth parameter B = measured bandwidth requirement parameter
b = allocated bandwidth parameter
Of = offset parameter
De = delta parameter
m = minimum bandwidth parameter
p = maximum bandwidth parameter
I = interval
T = time period

METHOD OF ADJUSTING A BANDWIDTH CAPACITY OF A DYNAMIC CHANNEL

PRIOR APPLICATIONS

This application is a U.S. national phase applicaton based upon International Application No. PCT/SE01/02395, filed 30 Oct. 2001; which claims priority from U.S. Provisional Application No. 60/244,452, filed 31 Oct. 2000.

TECHNICAL FIELD

The present invention relates to dynamic channels for channel-based link technologies.

BACKGROUND AND SUMMARY OF THE INVENTION

The traffic flow in information channels, such as dynamic transfer mode topologies, may vary greatly over time periods. If the flow capacity of a channel is too low, only a restricted amount of information may flow through the channel. If the flow capacity of the channel is too high, the channel takes up unnecessary resources from the entire system. There is a need for dynamically adjusting the allocated resources of information channels so that the capacity of the channel is fully adjusted to the actual traffic flow in the channel. For example, if the traffic flow is increased, more bandwidth should be allocated to the channel and if the traffic flow is decreased, the allocated bandwidth should be reduced and allocated elsewhere in the topology to most effectively use the resources available on the topology.

The present invention provides a solution to the above-described problems. More particularly, the method is for adjusting a bandwidth capacity of a dynamic channel in a network topology by allocating a first bandwith value (b1) to the dynamic channel wherein the channel extends from a first node to a second node in a network topology. The traffic flow in the channel is measured to calculate a measured bandwidth value (B1). It is determined if the measured bandwidth value (B1) is greater than the allocated bandwidth value (b1) minus an offset value (Of). When the bandwidth value (B1) is greater than the bandwidth value (b1) minus the offset value (Of), it is determined if the bandwidth value (B1) plus the offset value (Of) plus a delta parameter value (De) are greater than a peak bandwidth parameter value (p) wherein the parameter value (p) being a maximum allowable bandwidth value. When the bandwidth value (B1) plus the offset value (Of) plus the delta parameter value (De) are greater than the peak bandwidth parameter value (p), the bandwidth value (b1) is increased to the peak bandwidth parameter value (p). When the bandwidth value (B1) plus the offset value (Of) plus a delta parameter value (De) are not greater than the peak bandwidth parameter value (p), the bandwith (b1) is increased to a bandwidth value (b2) wherein the bandwidth value (b2) being greater than the bandwidth value (b1).

DETAILED DESCRIPTION

Figure 1:
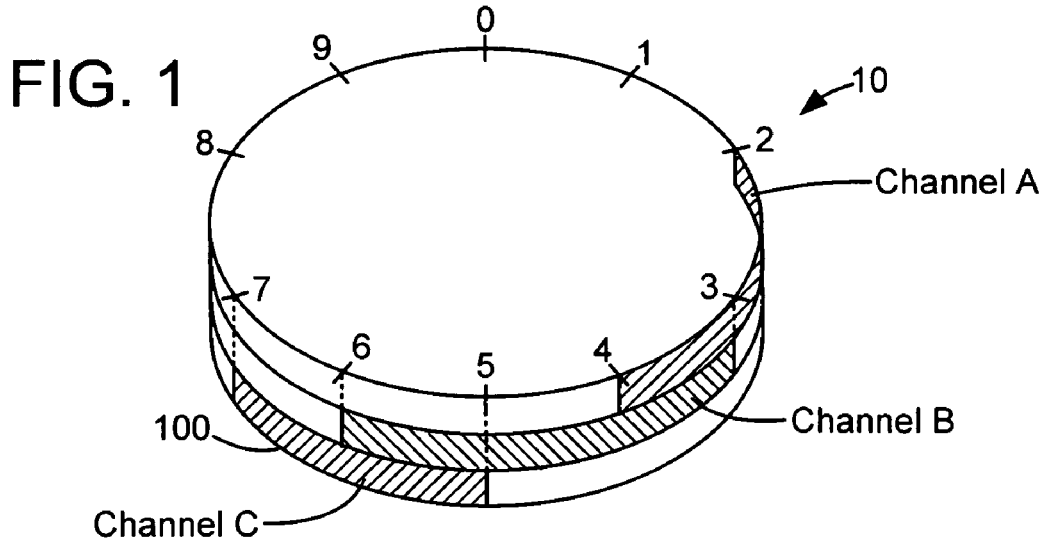
FIG. 1 is a schematic view of a DTM topology with channels.
Figure 2:
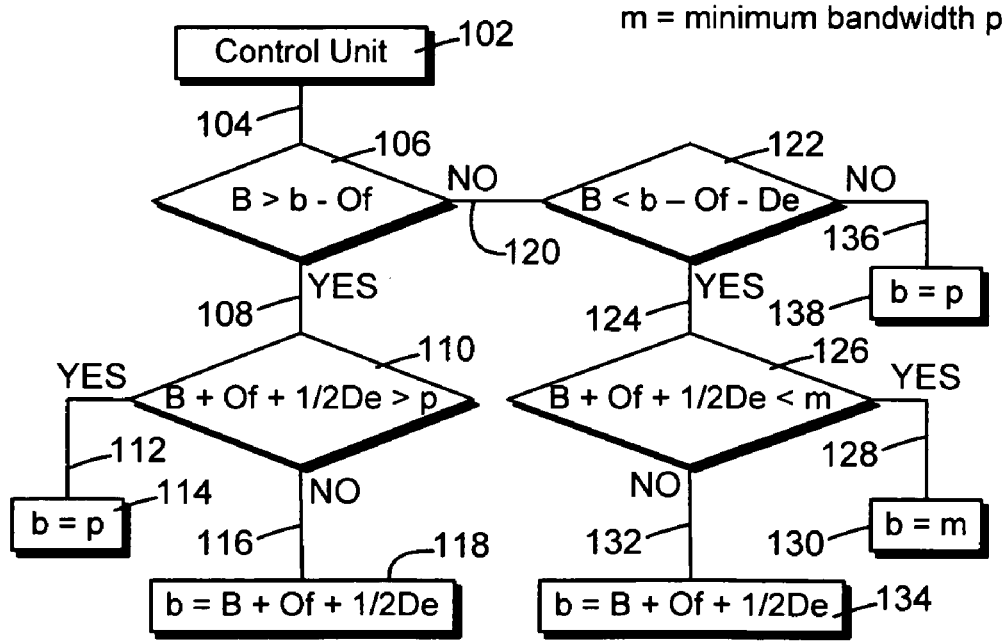
FIG. 2 is a schematic flow diagram of the dynamic channels.
Figure 3:
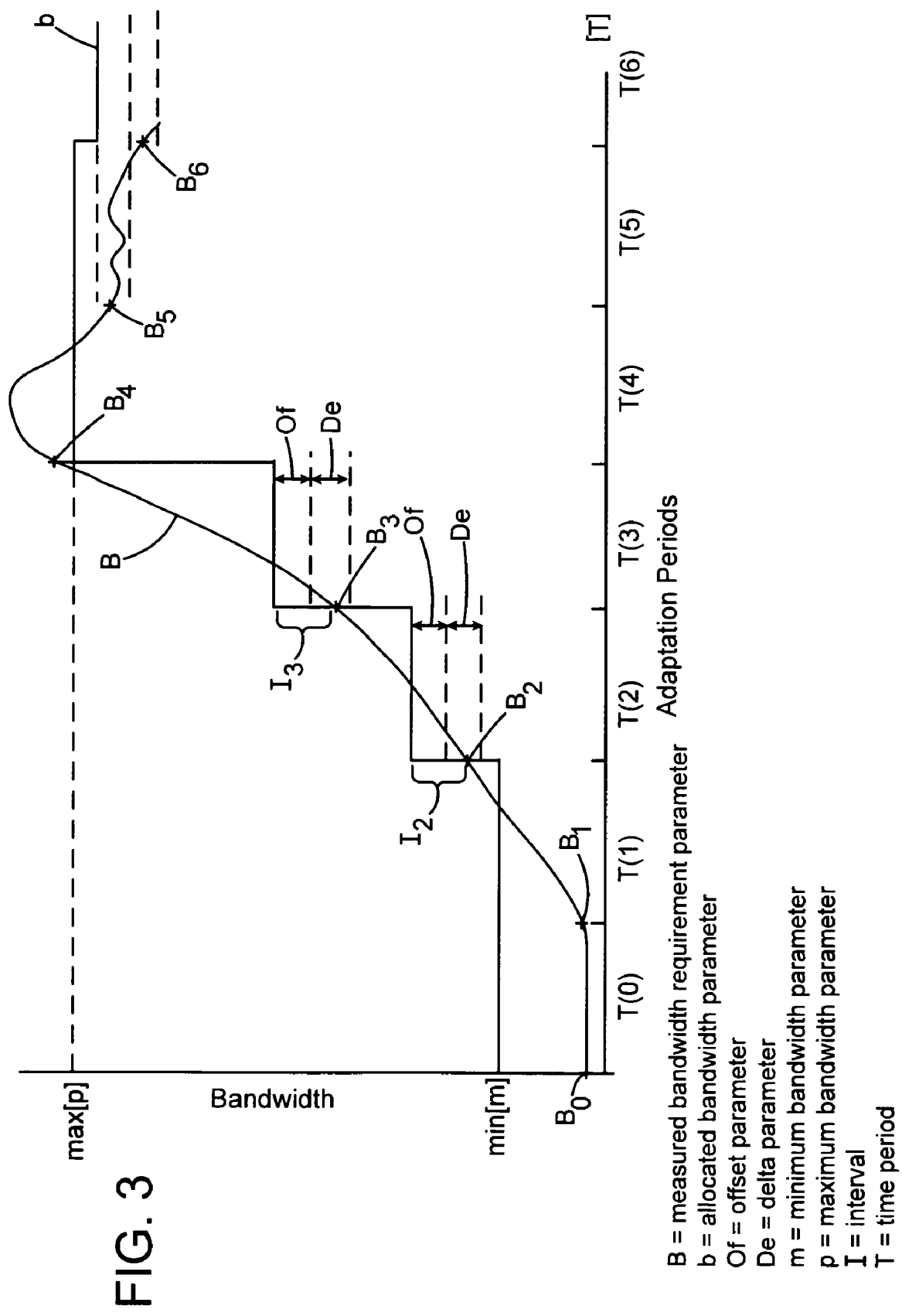
FIG. 3 is a graph showing the delta and offset parameters relative to the measured bandwidth requirement and allocated bandwidth.

With reference to FIGS. 1-3, the present invention is a method and device for effectively using dynamic channels in any suitable type of channel based link technology, such as dynamic transfer mode (DTM) topologies, that have traffic channels that may vary dynamically in size depending upon the actual traffic that is destined for each particular channel. It is to be understood that DTM is only used as an example of a suitable link technology to illustrate the features and concept of the dynamic channel of the present invention and that other types of link topologies may also be used.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (the Internet Protocol). DTM differs from burst switching in that information related to control and data are separated and DTM uses multicast, multi-rate, high capacity channels to support a variety of different classes of information flows.

It is possible to dynamically increase or decrease the allocated resources, such as the bandwidth, of an existing channel depending on the particular requirements of the user and the traffic in the channel at the time. A channel may be defined as a simplex connection from one source node to one or many destination nodes in a network. As indicated above, the network could be a DTM ring topology or any other type of network. One advantage of using a DTM ring topology is that it is almost guaranteed that the data will reach the receivers at the rate given by the capacity of the channel. The channels on the physically shared medium may be illustrated by a time division multiplexing (TDM) scheme. The total capacity of the shared medium may be divided into cycles having a length of 125 microseconds which are further divided into 64-bit slots. It is to be understood that other cycles and slot sizes may be used.

More particularly, FIG. 1 shows a typical DTM ring topology 10 with a plurality of nodes such as nodes 0-9. A channel A is established between the nodes 2-4, a channel B between the nodes 3-6 and a channel C between the nodes 5-7. If a slot reuse method is used, a single slot may be used multiple times on the ring topology 10. For example, channel A is using the same slots as channel B but on different segments. Similarly, channel B and channel C use the same slots but on different segments. This is referred to as slot reuse. Slot reuse enables simultaneous transmissions in the same slot over disjoint segments of the ring topology 10. Slot reuse may be described as a general method to better utilize shared links in the ring topology 10. To allow slot reuse in DTM, the block token format may be extended to include parameters describing the segments it is representing. The token management protocol may also be modified to avoid conflicts in the slot number dimension as well as the segment dimension.

The dynamic channel 100, as shown in FIG. 1, may be implemented into the DTM topology 10 or any other suitable type of link technology. The channel 100 may be a dynamic ingoing/outgoing channel that adapts its bandwidth capacity to an actual unidirectional traffic flow that occurs over the channel 100. The traffic may, for example, be web or video information that is being sent in a network topology. The channel 100 may be a unicast arrangement so that there is one sender and one receiver or a multi-cast arrangement that has many receivers. In general, if the traffic flow is increased, more bandwidth may be allocated to the channel 100 and if the traffic flow is decreased, the allocated bandwidth may be reduced and allocated elsewhere in the topology 10 to most effectively use the resources available on the topology 10.

To determine the most efficient bandwidth that should be allocated to the dynamic channel 100, the traffic flow may be measured and periodically checked so that the bandwidth may be dynamically adapted to the actual measured traffic flow over time. As best shown in FIG. 2, a control unit 102 may measure a variety of variables over the dynamic channel 100. For example, the unit 102 may measure the number of packets/bytes that are transmitted at certain time periods such as every 100 ms. The unit 102 may also measure the number of bits that are transferred per time unit. For example, the unit 102 may measure the actual traffic that is destined to be transferred over the channel 100. This traffic is typically destined to a node (s) and is given a bandwidth in bits per second. The actual traffic may be measured periodically to yield a sequence of parameter values: u(0), u(1), u(2) . . . etc. If the measured value of u(i), which indicates the bandwidth requirement of the channel, is higher than the allocated bandwidth b(i) for some time, packets of information may be dropped. However, the channel may have a queue feature so that temporary bursts of traffic increases by be absorbed, i.e., when the traffic flow, as measured by u(i), exceeds the bandwidth b(i) only for a limited period of time. Similarly, if the measured value of u(i) is less than the allocated bandwidth b(i) then the channel can handle the traffic flow. It may not be necessary for the channel 100 to utilize all the allocated bandwidth when information is transmitted over the channel 100. This means that the channel may have idle resources available that is not being used. It may then be necessary to reduce the capacity of the channel if the channel consistently has a sufficient amount of idle capacity.

The unit 102 may calculate a measured bandwidth requirement (B) of the channel 100 with a parameter B(j) which is a smoothed mean of u(j) according to equation (1) below:

$$B(j)=u(j-1)*7/8+u(j)/8. \quad (1)$$

The weighted mean of the bandwidth according to the equation (1) may be modified with other factor such as 5/6, 3/4 or any other suitable factor. In this way, the parameter B(j) tracks the running mean of the parameter u(j) with a memory function so that the old values of u(j) are gradually discarded and continually updated with new values for the u(j) parameter.

The measured bandwidth requirement (B), shown as the parameter B(j) in the equation (1), may be checked against the allocated bandwidth for every channel such as the channel 100. Additionally, the channel 100 may have a queue feature to adjust for minor changes of the incoming traffic flow. As mentioned above, if the measured bandwidth requirement is greater than the allocated bandwidth, the allocated bandwidth for the particular channel may be increased. Similarly, if the allocated bandwidth is too great compared to the measured bandwidth requirement, the allocated bandwidth may be decreased accordingly. This adaptation may occur at certain time intervals such as every second or at any other suitable time interval. The time period between every adaptation of the bandwidth allocation should be longer than the time interval between each measurement of the bandwidth requirement of the actual traffic flow.

More particularly, the control unit 102 may send a comparison signal 104 to a comparison unit 106. The unit 106 compares if the measured bandwidth parameter requirement B(j) is greater than the allocated bandwidth parameter b(j−1) from the previous time period T(j−1) minus an offset parameter (Of). In other words, the comparison in the unit 106 is performed for the time period T(j) so that the parameter B(j) at the time period T(j) is compared to the value of the parameter (b) from the previous time period T(j−1). The offset parameter (Of) may be seen as indicating if the allocated bandwidth parameter (b) should be adjusted to match or conform to the measured bandwidth parameter requirement (B).

If the measured bandwidth parameter (B) is greater than the bandwidth parameter (b) minus the offset parameter (Of) then the unit 106 transmits a yes-signal 108 to a comparison unit 110. This means that it may be necessary to increase the bandwidth allocation to the parameter (b) because the measured bandwidth requirement (B) exceeds the allocated bandwidth for the channel including the considerations of the offset parameter (Of).

The unit 110 receives the signal 108 and determines if the value of the bandwidth (B) plus the dynamic offset parameter (Of) and half the value of a delta parameter (De) is greater than a peak chanspec bandwidth parameter (p). The bandwidth allocation is not permitted to exceed the parameter (p) to prevent an over-allocation of resources to the channel.

The delta parameter (De) may be seen as a buffer to make sure that the number of allocation changes of the bandwidth parameter (b) are minimized. It is important to minimize the number of allocation changes of the bandwidth of the parameter (b) because any change of the bandwidth allocation of parameter (b) requires signalling resources to the other nodes in the network and this extra signalling takes up valuable resources. The over-allocation that is represented by the delta parameter (De) also ensures that the bandwidth parameter (b) is less sensitive to small increases in the traffic flow so that the parameter (b) can handle traffic flows that are slightly higher than the allocated bandwidth of the parameter (b) without requiring a change of the bandwidth allocation of the parameter (b). In the preferred embodiment, the offset parameter (Of) is greater than or equal to the delta parameter (De). Of course, the delta parameter (De) could also be set to be greater than the offset parameter (Of).

If the total value of the bandwidth requirement (B) plus the offset parameter (Of) and half the value of the delta parameter (De) is greater than the maximum value (p) then the unit 110 sends a yes-signal 112 to a setting unit 114. The unit 114 increases the value of the bandwidth parameter (b) so that the bandwidth parameter (b) is set to equal the value of the peak chanspec bandwidth parameter (p).

If the total value of the bandwidth parameter (B) plus the offset parameter (Of) and the half the delta parameter (De) is not greater than the peak parameter (p) then the unit 110 sends a no-signal 116 to a set unit 118. The unit 118 increases the value of the bandwidth parameter (b) so that the parameter (b) equals the total value of the bandwidth parameter (B) plus the offset parameter (Of) and half the value of the delta parameter (De). In this way, the bandwidth allocation to the bandwidth parameter (b) is adjusted to the measured bandwidth parameter (B) while being less than the maximum allowable value that is represented by the parameter (p).

If the unit 106 determines that the bandwidth parameter requirement (B) is not greater than the bandwidth parameter (b) less the offset parameter (Of), then the unit 106 sends a no-signal 120 to a comparison unit 122. The unit 122 determines if the measured bandwidth parameter requirement (B) is less than the bandwidth parameter (b) minus the offset parameter (Of) and the delta parameter (De). This is to determine if the bandwidth allocation to the parameter (b) should be reduced.

If the unit 122 determines that the parameter (B) is less than the total value of the bandwidth parameter (b) minus the parameter (Of) and minus the delta parameter (De), then the unit 122 sends a yes-signal 124 to a comparison unit 126 that determines if the total value of the parameter (B) plus the parameter (Of) and half the value of the delta parameter (De) is less than a minimum parameter (m). The default value for the minimum value parameter (m) may be set to equal zero. If this value is less than the allowable minimum value (m) then the unit 126 sends a yes-signal 128 to a setting unit 130 that sets the parameter (b) to equal the minimum parameter (m). If the total is not less than the parameter (m) then the unit 126 sends a no-signal 132 to a setting unit 134 that reduces the bandwidth allocated to the parameter (b) to equal the total of the parameter (B) plus the parameter (Of) and half the value of the delta parameter (De).

If the comparison unit 122 determines that the value of the bandwidth requirement (B) is not less than the total value of the parameter (b) minus the offset parameter (Of) and the delta parameter (De), then the unit 122 sends a no-signal 136 to a setting unit 138 that sets the parameter (b) to remain the same. In this case, there is no reason to change the bandwidth value allocated to the parameter (b) because the total value of the parameter (B) is not less than the total of the parameter (b) minus the offset value (Of) and the parameter (De) so there is a sufficient traffic flow to maintain the bandwidth allocated to the parameter (b).

FIG. 3 is a graphical illustration of the correlation between the measured bandwidth parameter requirement (B), that corresponds to B(j) in equation (1), affects the allocated bandwidth parameter (b) in view of the offset parameter (Of) and the delta parameter (De).

As indicated by a measured bandwidth parameter (B1), the slot allocation parameter (b) in the time period T(1) is set to the minimum value (m) although the value of the parameters (B1) is less than the total value of the parameter (b0) minus the offset parameter (Of) and the delta parameter (De). Normally, this correlation would trigger a reduction of the parameter (b) in the time period T(1) but the parameter (b) cannot have a value that is less than the minimum value (m) to ensure that the channel has a minimum bandwidth capacity.

In the time period T(2), the parameter (B2) is greater than the total value of the parameter (b) in the time period T(1) minus the offset parameter (Of). This means that it may be necessary to increase the bandwidth capacity of the parameter (b) so that the channel can handle the traffic flow. It should be noted that it is not sufficient to just exceed the minimum value (m) to change the allocation parameter (b). It is also necessary for the total value of the parameter (B2) to exceed the total of the current allocation parameter (b) minus the offset parameter (Of) to trigger the increase of bandwidth allocation to the parameter (b).

Because the total value of the parameter (B2) plus the offset parameter (Of) and half of the delta parameter (De) is not greater than the maximum allowable value (p), the value of the parameter (b) in the time period T(2) is permitted to be increased to be equivalent to the total value of parameter (B2) plus the offset parameter (Of) and half of the delta parameter (De), as indicated by the increase interval (I2) in FIG. 3. Similarly, the value of the parameter (b) in the time period (T3) is again increased to the value represented by the total of the parameter (B3) plus the offset parameter (Of) and half the delta parameter (De), as indicated by the interval (I3). The interval (I2) is preferably, but not necessarily, identical to the interval (I3). This increase of the parameter (b) is triggered by the fact that the value of the parameter (B3) is greater than the total value of the parameter (b) in the time period T(2) minus the offset parameter (Of). The increase of the parameter (b) in the time period T(3) is permitted because the total value of the parameter (B3) plus the offset value (Of) and half the value of the delta parameter (De) is less than the maximum allowable value (p).

As mentioned above, the actual use of the bandwidth in the channel is preferably measured more frequently than the time period between any change of the bandwidth allocation to the parameter (b). In this way, the time period between the determination if a bandwidth allocation changes should take place is greater than the time period between each measurement of the traffic in the channel as indicated by the parameter (B).

The allocation of the bandwidth to the parameter (b) is adjusted in this manner as long as the parameter (b) remains between the minimum value (m) and the maximum value (p). For example, the value of the parameter (B4) is greater than the total value of the parameter (b) in the time period T(3) minus the offset parameter (Of). However, the new value for the parameter (b) in the time period T(4) cannot be set equal to the total value of the parameter B(4) plus the offset parameter (Of) and half the delta parameter (De) because that would increase the parameter (b) to a value that is greater than the maximum value (p). Therefore, the value for the parameter (b) is set to the maximum value (p) in the time period T(4). This is to ensure that the channel does not use too much of the resources of the entire network.

FIG. 3 also shows the function of the delta parameter (De). More particularly, when the value for the parameter (B5) is not greater than the total value for the parameter (b) in the time period T(4) minus the offset parameter (Of) but greater than the total value of the parameter (b) in the time period T(4) minus the offset parameter (Of) minus the delta parameter (De), then there is no need to change the allocation parameter (b) in the time period T(5) so that the allocation parameter (b) remains the same as in the time period T(4).

In other words, when the parameter B(j) is less than B(j−1), the difference between B(j) and the parameter (b) in the time period T(j−1) must be more than the total value of the offset parameter (Of) and the parameter (De) to trigger a reduction of the allocated bandwidth of the parameter (b). In this way, the test for reducing the bandwidth allocation is stricter than for increasing the bandwidth allocation since it is sufficient for the parameter B(j) to be greater than the total value of the parameter b(j−1) minus the offset parameter (Of) to trigger an increase in the bandwidth allocation to the parameter (b). If the value of the measured bandwidth parameter (B) is consistently smaller than total value of the parameter (b) minus the offset parameter (Of) and the delta parameter (De) then the bandwidth allocation to the parameter (b) should be reduced.

Accordingly, the parameter (b) in the time period (T6) should be reduced because the value of the parameter (B6) is less than the total value of the parameter (b) in the time period (T5) minus the offset parameter (Of) and the delta parameter (De). The reduction of the parameter (b) is permitted because the total value of the parameter (B6) plus the offset parameter (Of) and half the value of the parameter (De) is greater than the minimum value (m).

While the present invention has been described in accordance with preferred compositions and embodiments, it is to be understood that certain substitutions and alterations may be made thereto without departing from the spirit and scope of the following claims.

We claim:

1. A method of adjusting a bandwidth capacity of a dynamic channel in a network topology, comprising:
    (a) allocating a bandwith value (b1) to the dynamic channel, the channel extending from a first node to a second node in the network topology;
    (b) measuring a traffic flow in the channel to calculate a measured bandwidth value (B1);
    (c) in a first comparison unit, determining if the measured bandwidth value (B1) is greater than the allocated bandwidth value (b1) minus an offset value (Of);
    (d) when the bandwidth value (B1) is greater than the bandwidth value (b1) minus the offset value (Of), determining if the bandwidth value (B1) plus the offset value (Of) plus a delta parameter value (De) are greater than a peak bandwidth parameter value (p), the parameter value (p) being a maximum allowable bandwidth value;
    (e) when the bandwidth value (B1) plus the offset value (Of) plus the delta parameter value (De) are greater than the peak bandwidth parameter value (p), increasing the bandwidth value (b1) to the peak bandwidth parameter value (p); and
    (f) when the bandwidth value (B1) plus the offset value (Of) plus the delta parameter value (De) are not greater than the peak bandwidth parameter value (p), increasing the bandwidth value (b1) to a bandwidth value (b2), the bandwidth value (b2) being greater than the bandwidth value (b1).

2. The method according to claim 1 wherein the method further comprises maintaining the bandwidth value (b1) at the same bandwidth value when the bandwidth value (B1) is less than the total value of the bandwidth parameter value (b1) minus the offset value (Of) and when the bandwidth value (B1) is greater than the total value of the bandwidth value (b1) minus the offset value (Of) and minus the delta parameter value (De).

3. The method according to claim 2 wherein the method further comprises determining if the bandwidth value (B1) plus the offset value (Of) and the delta parameter value (De) are less than a minimum value (m) when the bandwidth value (B1) is less than the total value of the bandwidth value (b1) minus the offset value (Of) and minus the delta parameter value (De).

4. The method according to claim 3 wherein the method further comprises setting the bandwidth value (b1) equal to the minimum value (in) when the bandwidth value (B1) plus the offset value (Of) and the delta parameter value (De) are less than the minimum value (m).

5. The method according to claim 3 wherein the method further comprises reducing the bandwidth value (b1) to the total value of the bandwidth value (B1) plus the offset value (Of) and the delta parameter value (De) when the bandwidth value (B1) plus the offset value (Of) and the delta parameter value (De) are less than the minimum value (m).

6. The method according to claim 1 wherein the step (f) comprises setting the bandwidth (b2) to the total value of the bandwidth (B1) plus the offset value (Of) plus the delta parameter value (De).

7. The method according to claim 1 wherein the method further comprises setting the offset value (Of) to a value that is greater than the delta parameter value (De).

* * * * *